United States Patent [19]

Jones

[11] Patent Number: 4,776,201
[45] Date of Patent: Oct. 11, 1988

[54] METHOD AND APPARATUS FOR CALIBRATING A DIFFERENTIAL PRESSURE TRANSDUCER

[75] Inventor: Stanley C. Jones, Littleton, Colo.

[73] Assignee: Marathon Oil Company, Findlay, Ohio

[21] Appl. No.: 137,555

[22] Filed: Dec. 22, 1987

[51] Int. Cl.$^4$ ............................................. G01L 27/00
[52] U.S. Cl. .................................................. 73/4 R
[58] Field of Search ...................... 73/4 R, 4 D, 4 V

[56] References Cited

U.S. PATENT DOCUMENTS

| | | | |
|---|---|---|---|
| 2,818,726 | 1/1958 | Amonette et al. | 73/4 R |
| 3,106,084 | 10/1963 | Hoffman et al. | 73/4 R |
| 3,107,515 | 10/1963 | Antonazzi et al. | 73/4 |
| 3,459,032 | 8/1969 | Yamaguchi et al. | 73/4 |
| 3,508,437 | 4/1970 | van Beek | 73/67.2 |
| 3,545,278 | 12/1970 | Chandler | 73/419 |
| 3,633,402 | 1/1972 | Miller, III et al. | 73/4 D |
| 3,657,926 | 4/1972 | Munson et al. | 73/404 |
| 3,696,659 | 9/1972 | Lawford | 73/4 R |
| 3,777,546 | 2/1973 | Rollins | 73/4 R |
| 4,102,175 | 7/1978 | Foster | 73/4 R |
| 4,489,786 | 12/1984 | Beck | 166/374 |
| 4,499,751 | 2/1985 | Riggs | 73/4 R |

FOREIGN PATENT DOCUMENTS 0047729 4/1981 Japan ................................. 73/4 R Primary Examiner—Stewart J. Levy
Assistant Examiner—Robert R. Raevis
Attorney, Agent, or Firm—Jack L. Hummel; Rodney F. Brown

[57] ABSTRACT

A low range differential pressure transducer is connected in a closed fluid system which also contains a U-tube filled with oil in its upper portion and mercury in its lower portion. Under conditions of high line pressure similar quantities of oil are displaced within the closed system from one arm of the U-tube to the other, causing the mercury in the latter arm to be forced down while rising in the other arm. The difference in height between the levels of mercury is used in calculating the differential pressure. By connecting a number of U-tubes in series the cumulative differences between the levels of mercury in the arms of each U-tube can be used in calculating the differential pressure for a transducer designed to measure differential pressure over a wider range of low pressures.

14 Claims, 2 Drawing Sheets

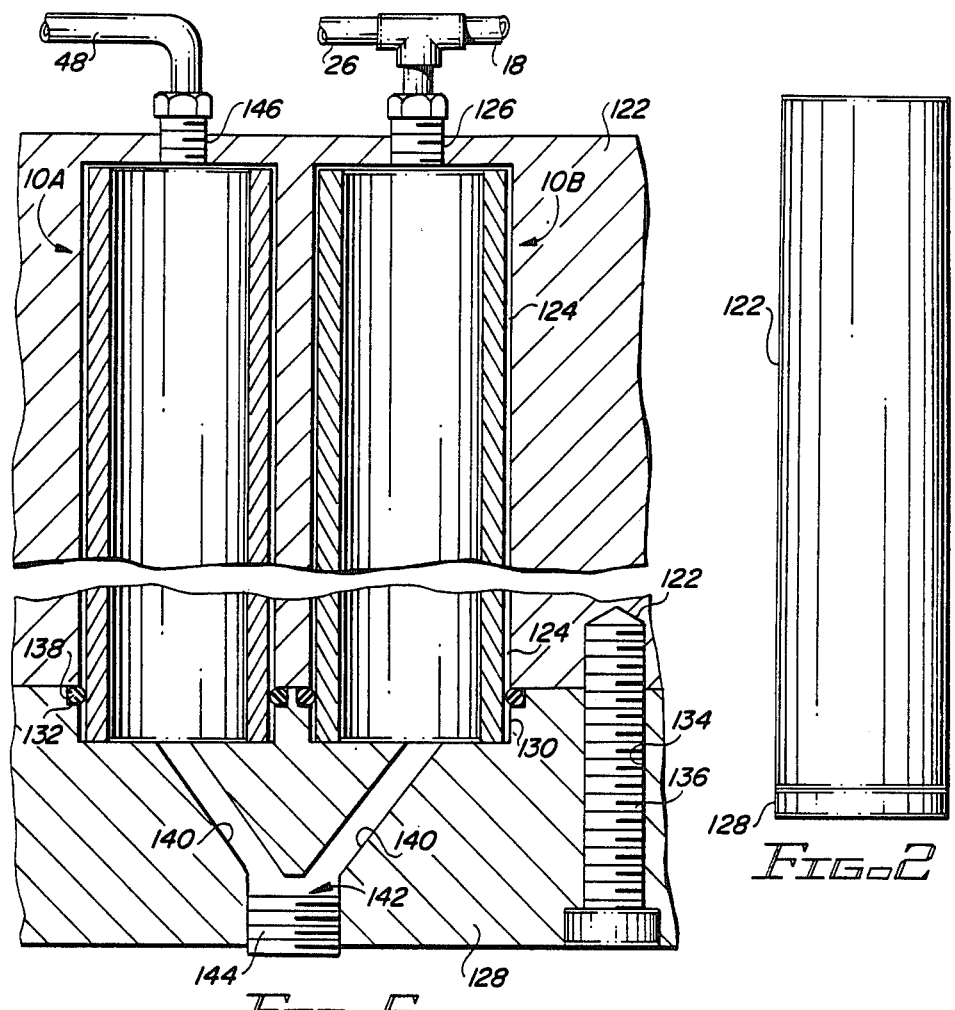
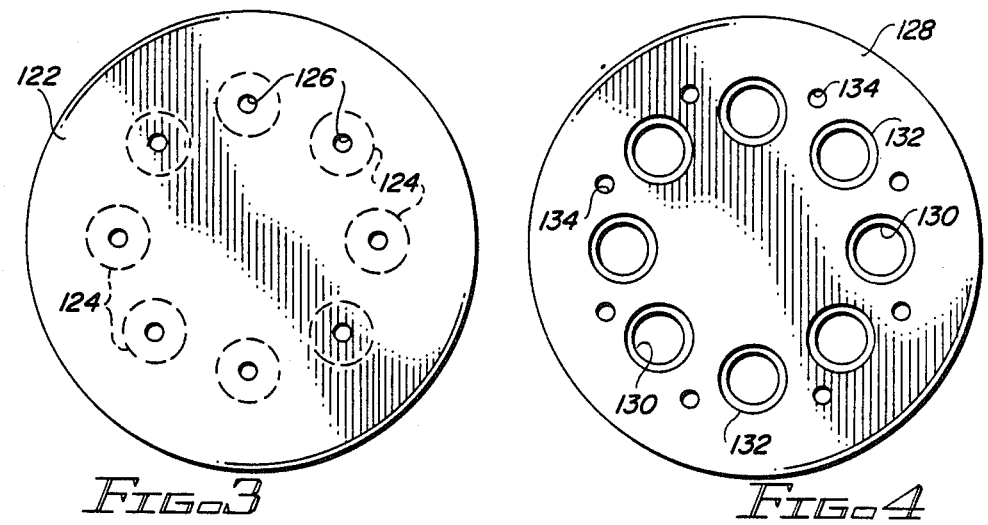

METHOD AND APPARATUS FOR CALIBRATING A DIFFERENTIAL PRESSURE TRANSDUCER

FIELD OF THE INVENTION

This invention relates to the calibration of a differential pressure transducer. More particularly, it relates to the calibration of a low range differential pressure transducer at high line pressures.

BACKGROUND OF THE INVENTION

To accurately measure small pressure changes in a high pressure fluid system by means of a differential pressure transducer it is essential that the transducer provide accurate readings throughout the entire range of line pressures to which it may be exposed. Often, however, low range transducers suffer significant calibration shifts and changes in sensitivity at high average line pressures. Apparently, the increased stresses produced by high line pressures cause sufficient elastic strain in the transducer case to shift the relative positions of the sensing mechanism and the diaphragm or other deformable element in the transducer, resulting in a change of calibration.

Although this is a problem affecting the accuracy of laboratory tests conducted under conditions of high fluid pressures as well as the accuracy of differential pressure monitoring in a continuously operating commercial system, no practical solutions have been forthcoming.

It would be highly desirable, therefore, to have an effective accurate method for calibrating a low range differential pressure transducer at high line pressures which can be quickly carried out and which does not require the use of expensive equipment.

BRIEF SUMMARY OF THE INVENTION

The invention makes use of a U-tube containing a relatively high density liquid such as mercury and a relatively low density liquid such as oil. The U-tube is included in a closed fluid system the pressure of which is set at a predetermined high level corresponding to zero differential pressure. A predetermined quantity of the low density liquid is withdrawn from one of the arms of the U-tube and added to the other arm, causing the high density liquid to rise in the one arm and recede in the other. By measuring the difference in height between the levels of the high density liquid the differential pressure can be calculated. This is the procedure that would be used in calibrating a differential pressure transducer designed to measure low differential pressures, such as a transducer having a differential pressure range of 0–25 psi.

To calibrate a low range transducer having a greater maximum differential pressure, such as 100 psi, a plurality of U-tubes are connected in series so that the withdrawal of low density liquid from one arm of an end U-tube in the series and the addition of a like quantity of liquid to an arm of the other end U-tube in the series causes the high density liquid to rise and fall in the corresponding arms of all the U-tubes. The summation of the absolute value of the difference in height between the levels of the high density liquid in the arms of all the U-tubes would be used in calculating the differential pressure.

Other features and aspects of the invention, as well as it various benefits, will be ascertained from the more detailed description of the preferred embodiment of the invention which follows.

BRIEF DESCRIPTION OF THE DRAWINGS

FIG. 2 is a side elevation of a vessel for holding the U-tubes in place;

FIG. 3 is a top view of the vessel of FIG. 2;

FIG. 4 is a top view of an end plate designed to be attached to the main body of the vessel and to form the bottom portion thereof; and FIG. 5 is an enlarged partial longitudinal sectional view of the vessel of FIG. 2, showing one of the U-tubes in place in the vessel and also one of the cap screws used to secure the end plate to the main body of the vessel.

DESCRIPTION OF THE PREFERRED EMBODIMENT

Figure 1:
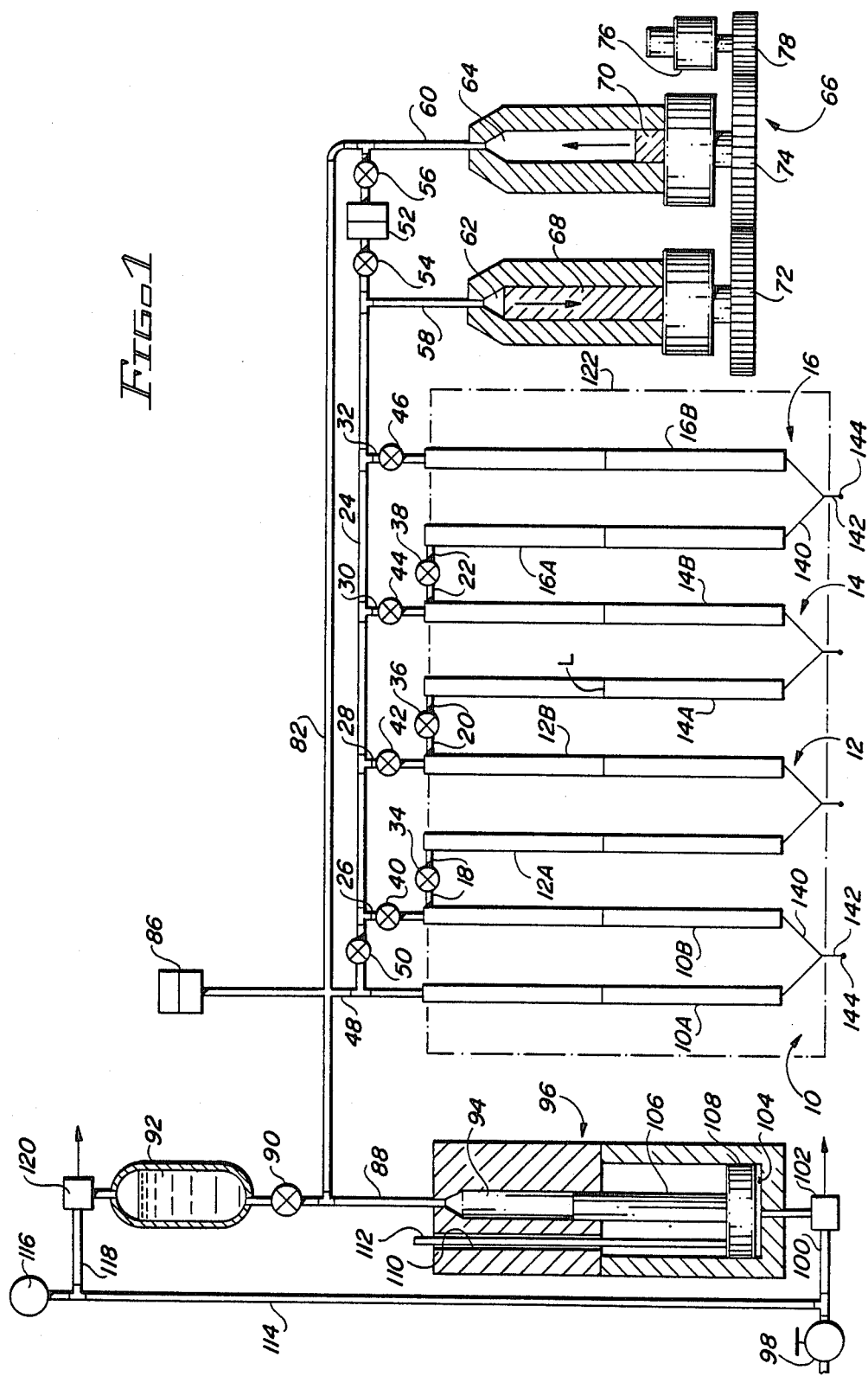
FIG. 1 is a schematic diagram of a fluid system including a plurality of U-tubes for calibrating a low range differential pressure transducer in accordance with the present invention.

Referring to FIG. 1, similar U-tubes 10, 12, 14 and 16 are provided with arms A and B, each reference letter also bearing a numerical prefix corresponding to the U-tube of which the arm is a part. The U-tubes are connected in series so that arm 10B of U-tube 10 is connected to arm 12A through conduit 18, arm 12B is connected to arm 14A through conduit 20 and arm 14B is connected to arm 16A through conduit 22. As illustrated, a relatively high density liquid such as mercury has been introduced into the U-tubes and fills substantially the lower half of the tubes. A relatively low density liquid such as oil has been introduced into the remaining portions of the U-tube arms. The level of mercury in each arm is indicated at L.

In addition, the arms 10B, 12B, 14B and 16B are further connected to a common conduit 24 by conduits 26, 28, 30 and 32, respectively. Each of the connecting conduits contains a valve to control the flow therethrough, so that conduits 18, 20 and 22 contain valves 34, 36 and 38, respectively, while conduits 26, 28, 30 and 32 contain valves 40, 42, 44 and 46, respectively. The common conduit 24 is also connected to a conduit 48 leading from arm 10A of U-tube 10, and a valve 50 is located in the conduit 24 between conduits 48 and 26 to control the flow to the arm 10A.

Also connected to the conduit 24 is the differential pressure transducer 52 to be calibrated, with valves 54 and 56 located in the conduit 24 on either side of the pressure transducer 52 to allow the transducer to be connected into and removed from the system. The conduit 24 is further connected at opposite sides of the valves 54 and 56 to conduits 58 and 60 leading to the cylinders 62 and 64 of a two piston positive displacement pump 66. The pistons 68 and 70 are geared together by gears 72 and 74 so that when motor 76 causes drive gear 78 to rotate, gears 72 and 74 will rotate an equal amount in opposite directions, causing the pistons 68 and 70 to move equal distances in opposite directions through a screw and screw gear arrangement, not shown. This in turn causes the pump to draw a quantity of fluid into the cylinder 62 when the piston 68 is moved in the direction of the arrow, at the same time expelling an equal quantity of fluid from the cylinder 64 as the piston 70 moves in the opposite direction.

The conduits 24, 48 and 60 are connected to conduit 82 to form a closed loop. The conduit 48 leads to a high pressure transducer 86 while the conduit 82 connects with conduit 88, one end of which leads through valve 90 to an oil reservoir 92 and the other end of which leads to the small chamber 94 of a pressure intensifier 96. A pressure regulator 98 is connected at one end to a source of nitrogen and at the other end, through conduit 100 and three-way valve 102, to the large chamber 104 of the pressure intensifier 96. The small piston 106 which operates in the small chamber 94 is connected to the large piston 108 operating in the large chamber 104 so that the two pistons move together as a unit. The ratio of the area of the large piston face to the area of the small piston face is the amount by which incoming pressure can be magnified into the system. For example, assuming a 10:1 ratio of the areas of the two pistons, if pressurized nitrogen of 1000 psig is supplied to the large chamber 104 of the pressure intensifier 96, the pressure in the system will be 10,000 psig. If desired, air vent 110 may act as the guide for a sight rod 112 connected to the piston 108 in order to give the operator a visual indication of the approximate position of the piston 108. A conduit 114 connects the conduit 100 with a transducer or pressure gauge 116 capable of measuring the pressure of the nitrogen. The conduit 114 also leads through conduit 118 and three-way valve 120 to the oil reservoir 92.

In operation, a low range differential pressure transducer 52 to be calibrated would be connected into the system with valves 54 and 56 closed. These valves would then be opened after the pistons 68 and 70 of the pump 66 are positioned as shown in FIG. 1 so that the piston 68 is at or slightly below the top of its stroke and the piston 70 is at or slightly above the bottom of its stroke. Assuming that the transducer 52 is a 100 psi differential pressure transducer, all the valves in the system would then be opened and the valve 120 set so as to admit pressurized nitrogen to the oil reservoir 92. Valve 102 is set to vent gas from chamber 104. The oil can be any suitable low density oil such as decane. The nitrogen pressure regulator 98 would be adjusted to allow nitrogen at 100 psig, as registered by pressure transducer 116, to drive oil from the reservoir 92 into the pressure intensifier 96. The connected pistons 106 and 108 would be pushed thereby to their lowermost position and a slight pressure (about 100 psig) would be placed on all parts of the system. It is to be understood that except for the portions of the U-tubes filled with mercury, all parts of the fluid system, including all the conduits as well as the cylinders 62 and 64 of the positive displacement pump 66, would contain oil.

Valve 90 is then closed and, after temporarily backing off the nitrogen pressure regulator to zero, the valves 102 and 120 are adjusted to prevent nitrogen from entering the oil reservoir 92 and to permit nitrogen to enter the pressure intensifier 96. The pressure regulator 98 is then opened, allowing nitrogen to push the piston 108 up to thereby increase the pressure of the oil in the system. When the pressure transducer 86 reads the desired high line pressure at which it is desired to calibrate the differential pressure transducer 52, valves 44, 42, 40 and 50 are closed. At this point all arms of the U-tubes are at the desired high pressure, and the differential pressure of the system is zero. The levels of mercury in all the arms of the U-tubes, therefore, should be the same.

The pump 66 is then actuated to move the pistons in the direction of the arrows, resulting in a predetermined volume of oil being displaced from the tube arm 16B through valve 46 and into the cylinder 62. An equal volume of oil is displaced from the cylinder 64 through the conduits 60, 82 and 48 and into the arm 10A. These simultaneous displacements force the mercury in tube arm 10A to be depressed, causing the mercury in tube arm 10B to rise so as to push oil from arm 10B through valve 34 and into tube arm 12A. The incoming oil in arm 12A depresses the mercury in that arm an equal volume. The same phenomenon occurs in all the tubes, so that at the end of the pump stroke there will be a differential in height between the mercury levels in the tube arms 10A, 12A, 14A, and 16A and the tube arms 10B, 12B, 14B and 16B.

To determine the differential pressure the summation of the absolute value of all the mercury height changes is multiplied by the density difference between the mercury and oil and also by the ratio of the local value of the acceleration of gravity to the gravity conversion factor. By actuating the pump to displace the oil and mercury a number of times, progressively increasing differential pressures can be obtained until the entire full scale value of the differential pressure transducer 52 is achieved.

When calibrating a differential pressure transducer the full scale value of which is small, say in the order of 25 psi or less, only the U-tube 10 need be used. This would be carried out by first pressurizing the tubes to the desired line pressure as explained above, then closing valves 34, 36, 38, 42, 44, 46 and 50. Oil displaced from the tube arm 10B would then flow through valve 40 directly into the cylinder 62 of pump 66. The computation described above would be used to determine the differential pressure, using the single height difference between the levels of mercury in tube 10. The same procedure can be used for calibrating an intermediate range differential pressure transducer which may require two or three U-tubes in series instead of the full complement of the four U-tubes shown. Of course even more U-tubes could be employed if the range of the differential pressure transducer requires it.

It will be understood that the same procedure would be carried out in calibrating a differential pressure transducer at other high line pressures.

Referring now to FIGS. 2 and 3, the tubes in an actual installation would be mounted in a vessel 122 formed of a high strength material such as steel. The vessel preferably is cylindrical in shape and contains a number of bores 124 evenly spaced in the vessel for receiving glass tubes forming the arms of the U-tubes. The bores 124 are spaced from the top of the vessel and are connected thereto by smaller diameter bores 126. As shown in FIGS. 2 and 4, the bottom of the vessel 122 is covered by an end plate 128 which contains bores 130 corresponding to the bores 124 so as to be a continuation thereof when the plate is in place on the vessel. The bores 130 are counterbored as at 132 to provide a groove for receiving an O-ring. The plate 128 is also provided with a number of bores 134 for receiving screws to hold the end plate in place on the vessel.

As illustrated in FIG. 5, the arms 10A and 10B of the U-tube 10 are comprised of precision bore glass tubes which would be inserted in the vessel 122 from the bottom. The tubes may be of any convenient dimensions so long as they are of sufficient length to accommodate the displacement of the oil and mercury without the mercury reaching the tops of the tubes, and of a diameter permitting ready flow of the liquids. The wall thickness of the tubes should also be sufficient to permit the necessary precision boring and to impart enough strength to the tubes to withstand the stresses to which they are subjected. In one suggested arrangement, for example, the tubes are 60" long with an outside diameter of 12 mm. The diameter of bores 124 in the steel cylinder is ½ inch.

After all the tubes are in place end plate 128 is then attached by means of suitable screws 136. The bottoms of the tubes rest on the bottoms of the bores 130, which are aligned with the bores 124, and O-rings 138 are provided in the counterbores or grooves 132 for the reason explained below. The bottoms of the bores 130 are connected by small diameter bores 140 to a cavity 142 which is closed during use by a suitable high pressure fitting 144.

The bores 124 communicate through suitable fittings 146, which extend through bores 126, to the conduits connecting the U-tubes to the fluid system. Thus the fittings connect the tube 10A to conduit 48, and tube 10B to a tee leading to conduits 18 and 26.

In practice, the mercury can be introduced into the tubes through the fitting 144 by either filling the tubes to the desired level or filling the tubes completely with mercury and then draining the excess. When oil is subsequently introduced into the system from the reservoir, it will fill the entire space remaining in the system, including the annular spaces between the glass tubes and the bores 124 all the way down to the O-rings 138. In this manner each tube is hydrostatically balanced, so that even at high line pressures a low maximum stress, in the order of only about 12 psi, is exerted on any glass tube. Because the volume of oil in the annular spaces of the vessel remains constant, the volume of oil displaced by the pump 66 equals the volume of mercury displaced within the tubes. The O-rings 138 prevent mercury, which occupies the annular spaces between the tubes and the bores 130 in the end plate 128, from flowing up into the annular spaces between the tubes and the bores 124 of the main vessel.

The measurement of the height of the mercury in the tubes may be carried out by either of two techniques. One technique involves calibrating the mercury height change for a given pump displacement. This can be done visually by placing the tubes in a transparent plastic container which is geometrically similar to the steel vessel which would be used under the high line pressures employed during the actual calibration of a differential pressure transducer. By noting the change in the mercury meniscus height corresponding to the pump volumetric change for each controlled movement of the pump piston, a height versus pump displacement change calibration curve can be generated for all the tubes.

The second technique involves the use of an ultrasonic transducer mounted in the top of each tube, enabling the distance of the interface between the oil and the mercury to be determined as a function of the acoustic velocity of the oil and the elapsed time between a sound pulse and the reception of its reflection. The acoustic velocity of the oil in the system would have to be determined as a function of pressure and over the anticipated range of ambient temperature variations. This technique could be used if it is found that uncertainty is introduced in the first technique by the oil film which tends to remain on the walls of the tubes when the mercury displaces the oil.

It should now be clear that the present invention provides a simple yet accurate method for calibrating a low range differential pressure transducer at high line pressures. A single U-tube is sufficient for calibrating a transducer the range of which is very low, such as one which measures differential pressures only up to 10 or 25 psi, while a number of U-tubes connected in series will accurately calibrate a transducer whose range permits higher differential pressure measurements. By carefully controlling both the high line pressure under which the calibration is conducted and the amounts of oil displaced in the system, the differential pressure can be accurately determined.

In addition, the hydrostatically balanced arrangement of the tubes which subjects the U-tubes to low maximum net stresses enables glass tubes to be used even under the high line pressures at which the differential pressure transducer is calibrated. Precision bored tubes can thereby be utilized with their inherently better wetting ability than metal. Good wetting properties are important when working with mercury because this enhances the formation of a clean uniform mercury meniscus, which is important to the measurement of the level of mercury in the tubes.

It should be obvious that although a preferred embodiment of the invention has been described, changes to certain features of the embodiment may be made without departing from the spirit and scope of the invention as defined in the appended claims.

What is claimed is:

1. A method of calibrating a low range differential pressure transducer at high line pressures, comprising the steps of:

provibing a closed fluid system including the differential pressure transducer and a U-tube, the lower portion of the U-tube containing a relatively high density liquid and the upper portion of the U-tube containing a relatively low density liquid, the relatively low density liquid being supported in the arms of the U-tube by the relatively high density liquid and extending throughout the remainder of the fluid system;

adjusting the fluid pressure in the system to a predetermined high pressure, the differential pressure at such point being zero;

displacing within the closed system a predetermined quantity of the relatively low density liquid from one of the arms of the U-tube and a like quantity of the relatively low density liquid into the other arm of the U-tube, causing the relatively high density liquid to rise in said one arm and to be depressed in the other arm;

measuring the difference in height between the levels of the relatively high density liquid in the arms of the U-tube; and calculating the differential pressure, using the measured height difference in the calculations.

2. A method of calibrating a low range differential pressure transducer according to claim 1, wherein the predetermined quantity of relatively low density liquid displaced from one of the arms of the U-tube is moved into a first chamber and wherein the predetermined quantity of relatively low density fluid displaced into the other arm of the U-tube is moved out of a second chamber, the differential pressure transducer to be calibrated being fluidly connected in the fluid system between the first and second chambers.

3. A method of calibrating a low range differential pressure transducer according to claim 1, wherein predetermined quantities of the relatively low density liquid are displaced from the one arm of the U-tube and displaced to the other arm of the U-tube a plurality of times, the difference in height between the levels of the relatively high density liquid being measured for each such displacement of the relatively low density liquid, the measurements being used to calculate the differential pressure until the full scale value of the differential pressure transducer is substantially reached.

4. A method of calibrating a low range differential pressure transducer according to claim 1, wherein the relatively high density liquid is mercury and the relatively low density liquid is oil.

5. A method of calibrating a low range differential pressure transducer according to claim 1, wherein a plurality of U-tubes are connected in series, the differential pressure being calculated by using the summation of the absolute value of the difference in height between the levels of the relatively high density liquid in the arms of all the U-tubes in the series.

6. A method of calibrating a low range differential pressure transducer according to claim 1, wherein the differential pressure is calculated by multiplying the measured height difference by the difference in density between the liquids and by the ratio of the local value of the acceleration of gravity to the gravity conversion factor.

7. Apparatus for use in calibrating a low range differential pressure transducer at high line pressures, comprising:
a closed fluid system including the differential pressure transducer and a U-tube, the lower portion of the U-tube containing a relatively high density liquid and the upper portion of the U-tube containing a relatively low density liquid, the relatively low density liquid being supported in the arms of the U-tube by the relatively high density liquid and extending throughout the remainder of the fluid system;
means for setting and maintaining the pressure of the system at a predetermined high pressure;
means for displacing within the closed system a predetermined quantity of the relatively low density liquid from one of the arms of the U-tube and a like quantity of the relatively low density liquid to the other arm of the U-tube to cause the level of the relatively high density liquid in said one arm to rise and the level of the relatively high density liquid in the other arm to be depressed, whereby the difference in height between the levels of the relatively high density liquid in the arms of the U-tube may be measured and the differential pressure calculated.

8. Apparatus for use in calibrating a low range differential pressure transducer according to claim 7, wherein the arms of the U-tube are contained in cylindrical bores in a vessel comprised of high pressure resistant material.

9. Apparatus for use in calibrating a low range differential pressure transducer according to claim 8, wherein the arms of the U-tube comprise glass tubes having open bottom ends, the vessel containing connecting bores extending from the bottoms of the bores in which the glass tubes are contained.

10. Apparatus for use in calibrating a low range differential pressure transducer according to claim 9, including sealing means between the lower walls of each tube and the surrounding walls of the bores for preventing the relatively high density liquid from flowing up the annular space between the tubes and their associated bores beyond the sealing means.

11. Apparatus for use in calibrating a low range differential pressure transducer according to claim 10, wherein the annular space between the tubes and the associated bores is filled with the relatively low density liquid above the sealing means.

12. Apparatus for use in calibrating a low range differential pressure transducer according to claim 11, wherein the relatively high density liquid is mercury.

13. Apparatus for use in calibrating a low range differential pressure transducer according to claim 7, including a plurality of U-tubes connected in series, the means for displacing the relatively low density liquid being connected in the system so as to displace the relatively low density liquid from the corresponding arms of all the U-tubes in the system.

14. Apparatus for use in calibrating a low range differential pressure transducer according to claim 13, wherein the means for displacing the relatively low density liquid comprises a pump having two pistons, one of the pistons advancing in one direction while the other piston withdraws in the opposite direction so as to simultaneously displace equal amounts of liquid in both directions.

* * * * *